Patented Feb. 12, 1935

1,991,191

UNITED STATES PATENT OFFICE 1,991,191

MANUFACTURE OF 1-NITRO-ANTHRAQUINONE-6-CARBOXYLIC ACID

Earl Edson Beard, South Milwaukee, and Ralph Norbert Lulek, Milwaukee, Wis., assignors to E. I. du Pont de Nemours & Company, Wilmington, Del., a corporation of Delaware No Drawing. Application March 29, 1933, Serial No. 663,340

3 Claims. (Cl. 260—57)

This invention relates to the preparation of carbon compounds and more particularly to the preparation of 1-nitro-anthraquinone-6-carboxylic acid. It especially contemplates the nitration of anthraquinone-2-carboxylic acid.

The known process for the preparation of 1-nitro-anthraquinone-6-carboxylic acid is long, tedious and impractical for use on a commercial scale. It was devised by Eckert (Monats. 35, 289-296; 1914). According to this known process 2-methyl-anthraquinone is brominated to produce omega-di-bromo-2-methyl-anthraquinone which is in turn hydrolyzed to anthraquinone-2-aldehyde. Thereafter this product (the aldehyde) is nitrated, producing 1-nitro-anthraquinone-6-aldehyde which compound is subsequently oxidized to 1-nitro-anthraquinone-6-carboxylic acid.

This invention has for an object the preparation of 1-nitro-anthraquinone-6-carboxylic acid by a novel process, its preparation by a process which is commercially practical and its preparation by a greatly simplified procedure. Other objects are the nitration of anthraquinone-2-carboxylic acid and the development of a process which makes available for the synthetic dye industry a valuable organic chemical. A still further object is the nitration of 2-anthraquinone-carboxylic acid with nitric acid in the presence of sulfuric acid. A general advance in the art and other objects which will appear hereinafter, are also contemplated.

These objects are accomplished by treating anthraquinone-2-carboxylic acid with nitric acid.

The invention will be further understood from a consideration of the following detailed description and specific examples in which the parts are given by weight.

Example I

Ten (10) parts of anthraquinone-2-carboxylic acid were dissolved in one hundred (100) parts of 95% sulfuric acid and cooled to 0° C.-5° C. Twelve (12) parts of a mixture consisting of 32% nitric acid ($HNO_3$) and 68% sulfuric acid ($H_2SO_4$) were added to the sulfuric acid solution. After about one-half hour the temperature was allowed to rise to 20° C.-60° C. and held within that range for 1-2 hours. The reaction mass was then drowned in water and filtered. The residue, after drying was added to 12-15 times its weight of boiling glacial acetic acid. After boiling the resultant for one-half to one hour, it was cooled to about 90° C.-100° C. and filtered.

Example II

Ten (10) parts of dry anthraquinone-2-carboxylic acid were slowly added to one hundred (100) parts of fuming nitric acid while the temperature was maintained at 10° C.-15° C. After complete solution of the organic acid, the mass was held at a temperature of about 15° C. for 3-4 hours. The temperature was then allowed to rise to about 25° C. and maintained at that point for 12-15 hours. The 1-nitro-anthraquinone-6-carboxylic acid, which separated from the resultant solution was filtered off on a stone filter. After allowing the filtrate to stand for one to two days, a second crop of 1-nitro-anthraquinone-6-carboxylic acid was obtained by similar filtration.

The invention, of course, is not limited to the specific details set out in the above examples. A wide variety of conditions may be employed as will be clear to those skilled in the art. The particular conditions set out in the examples are those which have been found to give very desirable results. It is not necessary that the anthraquinone-2-carboxylic acid be dissolved in sulfuric acid before the treatment with nitric acid. If desired the nitration may be accomplished by the use of nitric acid alone as indicated in Example II.

The proportion of anthraquinone-2-carboxylic acid and nitrating medium, may be varied to suit the will of the person carrying out the nitration process. A greater proportion of nitrating medium than that disclosed in the examples, while usable has not been found to give generally superior results. Lesser proportions of nitrating medium than that mentioned in the examples, tend to slow down the reaction. When the amount of nitrating medium does not contain sufficient nitro radicals to molecularly equal the amount of anthraquinone-2-carboxylic acid present (that is, the amount required to molecularly combine to produce 1-nitro-anthraquinone-6-carboxylic acid) the resultant product contains some unchanged anthraquinone-2-carboxylic acid.

Nitrations carried out at temperatures greater than those utilized in the specific examples tend to give a less desirable product although such high temperatures can be used if desired. Lower temperatures than those of the specific examples tend to slow down the reaction. In addition to this disadvantage the lower temperatures are not desirable for the reason that refrigeration entails mechanical difficulties and is a source of added expense.

The time of nitration is readily determined empirically. A satisfactory method of testing comprises analyzing a test portion of the product for nitrogen. Apparently no advantage is gained by carrying out the treatment with the nitrating medium after the desired nitration has taken place.

The proportion of acetic acid and temperature utilized for the recrystallization of the 1-nitro-anthraquinone-6-carboxylic acid may be regulated to suit the convenience of the person carrying out that step of the process.

This invention has the advantage that a valuable organic chemical and intermediate is prepared by a very simple commercially practical process.

As many apparently widely different embodiments of this invention may be made without departing from the spirit and scope thereof, it is to be understood that we do not limit ourselves to the specific embodiments thereof except as defined in the appended claims.

We claim:

1. The process which comprises mixing about 10 parts of anthraquinone-2-carboxylic acid with about 100 parts of concentrated sulfuric acid, adjusting the temperature to about 0° C.–5° C., adding about 12 parts of a mixture consisting of about 32 parts of nitric acid and about 68 parts of sulphuric acid, after about one-half hour adjusting the temperature to about 20° C.–60° C., maintaining this temperature for about 1–2 hours, drowning the reaction mass in water and filtering off the nitrated anthraquinone-carboxylic acid.

2. The process which comprises mixing about 10 parts of anthraquinone-2-carboxylic acid with about 100 parts of concentrated sulfuric acid, adjusting the temperature to about 0° C.–5° C., adding about 12 parts of a mixture consisting of about 32 parts of nitric acid and about 68 parts of sulfuric acid, after about one-half hour adjusting the temperature to about 20° C.–60° C., maintaining this temperature for about 1–2 hours, drowning the reaction mass in water, filtering off the nitrated anthraquinone-carboxylic acid, adding the residue to about 12–15 times its weight glacial acetic acid, boiling the mixture for about one-half to one hour, adjusting the temperature to about 90° C.–100° C. and filtering.

3. The reaction mass obtainable by mixing about 10 parts of anthraquinone-2-carboxylic acid with about 100 parts of concentrated sulfuric acid, adjusting the temperature to about 0° C.–5° C., adding about 12 parts of a mixture consisting of about 32 parts of nitric acid and about 68 parts of sulfuric acid, after about one-half hour adjusting the temperature to about 20° C.–60° C. and maintaining this temperature for about 1–2 hours.

EARL EDSON BEARD.
RALPH NORBERT LULEK.